G. T. WADE.
WEIGHING AND BAGGING MACHINE.
APPLICATION FILED MAR. 11, 1909.

975,005.

Patented Nov. 8, 1910.

2 SHEETS—SHEET 1.

WITNESSES

INVENTOR
GEORGE T. WADE
BY
ATTY.

G. T. WADE.
WEIGHING AND BAGGING MACHINE.
APPLICATION FILED MAR. 11, 1909.

975,005.

Patented Nov. 8, 1910.

2 SHEETS—SHEET 2.

WITNESSES

INVENTOR
GEORGE T. WADE
BY
ATTY.

UNITED STATES PATENT OFFICE.

GEORGE T. WADE, OF ROCKLAND, MAINE.

WEIGHING AND BAGGING MACHINE.

975,005.  Specification of Letters Patent.  Patented Nov. 8, 1910.

Application filed March 11, 1909. Serial No. 482,728.

*To all whom it may concern:*

Be it known that I, GEORGE T. WADE, a citizen of the United States, residing at Rockland, county of Knox, State of Maine, have invented certain new and useful Improvements in Weighing and Bagging Machines, of which the following is a specification.

This invention relates to weighing and bagging machines, and particularly to machines for thus handling finely divided material, that herein set forth being shown as adapted for the weighing and bagging of such material as lime. The handling of material of this sort in such an operation is made difficult by the tendency of the material to pack in the feeding, and to entrain air in the bagging thereof.

To this end and to the further end of improving the general means for accurately weighing and packing, I have devised my present invention in which I provide for continuously moving the material in the feeding thereof and of passing it to the containers in such a way that uniformity of flow is secured and that the air be allowed to escape and the packages filled in compactly with the material.

I have also devised means for checking the delivery and making the cut off of the flow prompt and capable of delicate adjustment.

These features will be more fully set forth in the specification which follows and are illustrated in the drawings which form a part thereof, in which I have shown and described an illustrative device embodying the principles and particularly adapted to the handling of hydrated lime.

Figure 1:
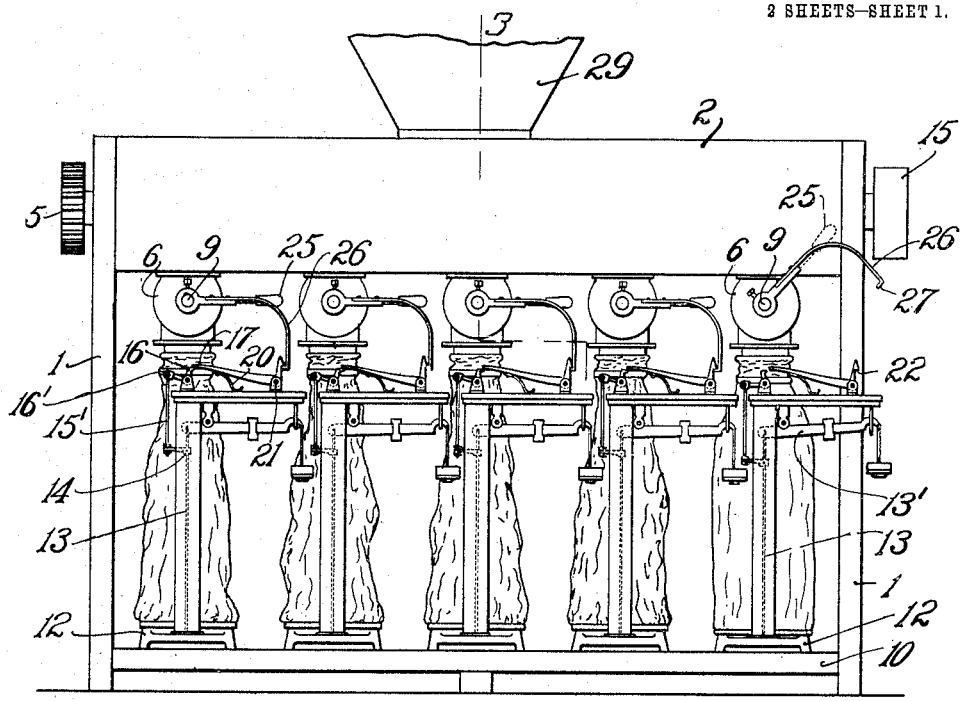
Figure 2:
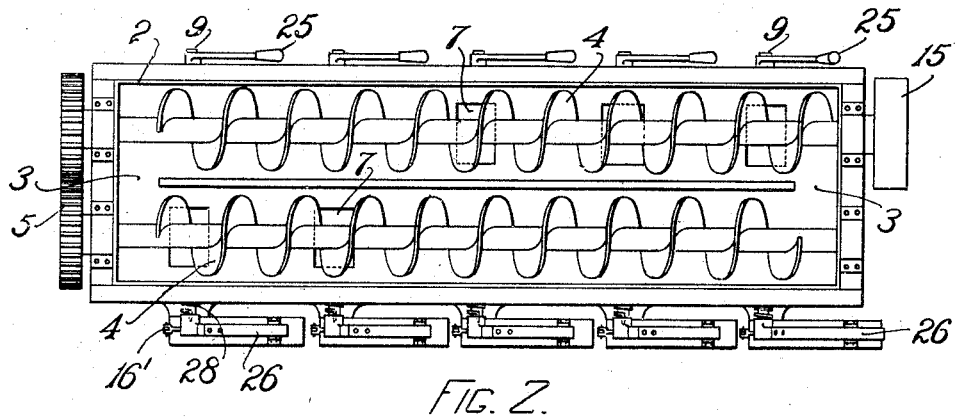
Figure 5:
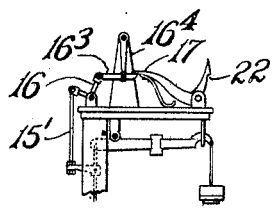
Figure 3:
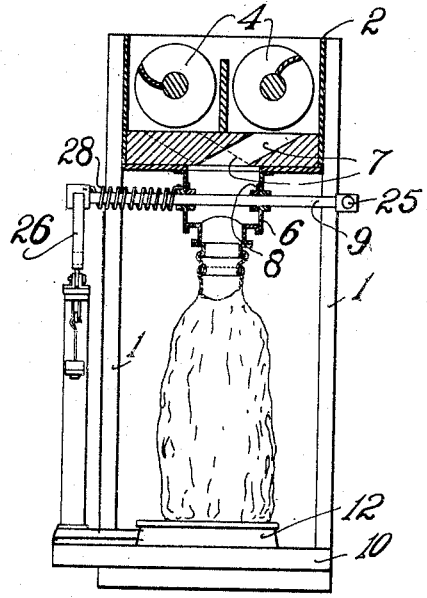
Figure 4:
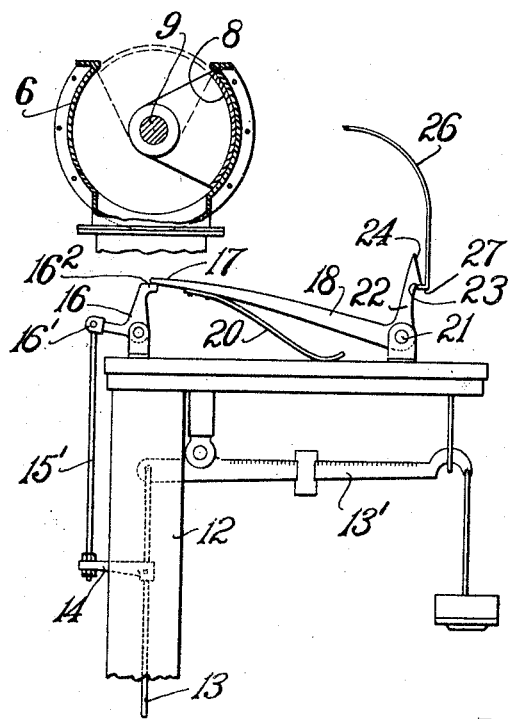

In these drawings: Figure 1 is a rear elevation of the machine showing the feed for the material, Fig. 2 is a plan view of the machine, Fig. 3 is a side section from the left on line 3—3, Fig. 1, Fig. 4, a detail of scale and latch and valve structure broken away in part, and Fig. 5 is a modification of the release.

1 are uprights supporting a double trough 2 having communicating passages 3 between the two parts.

4 are a pair of helicoids geared together at 5 to feed in opposite directions to secure a circulation of the material through the troughs 2.

6 are valve casings depending from the troughs 7 and opening therein through passages 7. In each casing 6 is a segmental valve 8 mounted on a shaft 9 to rotate in said casing 6 to cover or uncover the mouth of the passage 7.

15 is a power pulley for driving the helicoids.

On the supports 1 is carried a platform 10 on which are located scales 12, one under each of the hoppers 11. To the upright rods 13 of these scales are clamped at 14 an extension rod $15^1$ which is connected to one arm $16^1$ of a bell crank 16. The other arm is provided with a toe $16^2$ (see Fig. 4) which supports the end 17 of a lever 18 normally held up by a leaf spring 20.

In the detail in Fig. 5 I have shown a modified form of release. In this form a laterally movable bolt $16^3$ which is swung from a support $16^4$ and connected to the upper end of the bell crank supports the rear end 17 of the lever arm 18 during the filling. The bolt thus swung withdraws in a substantially horizontal line thus making the release with the least possible friction. The lever 18 is pivoted at 21 and provided with a vertical catch 22. The catch 22 has a notch 23 and a beveled end 24. The shafts 9 on which the valves 8 are mounted are provided at their forward ends with levers 25.

In order to provide for the adjustment of the valves so that they may be set to open a greater or less amount, an adjustable connection is made by means of set screws $9^1$ which connect their rear ends with curved spring arms 26 having a turned in end 27 adapted to engage the notch 23 of the catch 22.

28 are springs coiled on the shaft 9 and tending to rotate the shafts to close the valves 8.

The operation of the device is as follows: The troughs 11 may be filled by any desirable manner as by a chute indicated in Fig. 1 at 29. Material will then be circulated back and forth through the parallel troughs by the helicoids 4. As the material passes over the casings 6 it will drop into the same through the passages 7, being mixed and loosened by the blades of the helicoids 4 as they rotate. The valves 8 normally stand closed and are held in that position by the coiled springs 28. If a bag be hung on the support under the delivery mouth of the casing 6 and the hand lever 25 depressed, the valve 8 will be opened and the flow started. When the predetermined weight of lime has been delivered to the bag the scale arm 13¹ upon which the counter-weight has been adjusted to regulate it to said predetermined weight will be raised and the connecting rods 13 lying beyond the point of fulcrum of the lever arms will descend. This causes, through the rod 15, the rocking of the bell crank 16 and the consequent release of the arm 18 which is depressed by the upward pull of the bent arm 26 on which the spring 28 is acting.

By the arrangement herein set forth the attendant has only to remove the full bags and replace them with those to be filled and, as the several hoppers may be arranged to act successively, a single attendant may easily run the machine and do so without the necessity of breathing the lime dust which is thrown off whenever it has been necessary to overcome the packing of the lime or the settling of the same in the bags by hand.

Various modifications in the locking latch, in the transmitting mechanism, in the arrangement of the feed, and in other parts of the device may obviously be made without departing from the spirit of my invention.

While the bag is shown loosely attached to the mouth of the hopper it is to be understood that the bag may be supported by any sort of a holder, that shown in my former application, Ser. No. 376,989, being well adapted for this purpose.

What I therefore claim and desire to secure by Letters Patent is:—

1. In a device of the class described, a supply bin having a closed circuit and a plurality of discharge openings along the same and means for positively circulating the material therein through said circuit.

2. In a device of the class described, a supply bin, continuously communicating troughs therein and having a plurality of discharge openings and means for positively circulating material through said troughs.

3. In a device for filling receptacles, a pair of parallel troughs having communicating ends, and oppositely acting helicoids therein for positively circulating the material therethrough.

4. In a device for filling receptacles, a supply bin, means for positively circulating the material therein, a plurality of delivery chutes in the line of said circulation, and means for closing said chutes upon the delivery therefrom of a predetermined weight of material.

5. In a device for filling receptacles, a supply bin, means for positively circulating the material therein, a plurality of delivery chutes in the line of said circulation, a scale at each chute, a valve in each chute and an operative connection between said scales and valve for closing the latter upon the operation of the scales.

6. In a device for filling receptacles, a source of supply, a delivery opening therefrom, a cut-off, means tending normally to hold said cut-off shut, a catch pivoted between its ends, means on one end of said pivoted catch to hold said means open, a swinging link, a laterally moving stop supported thereon for engagement with the other end of said catch and a pivoted arm for operating said stop.

In testimony whereof, I affix my signature in presence of two witnesses.

GEORGE T. WADE.

Witnesses:
FREDERICK J. HALL,
FRANK H. INGRAHAM.